(12) United States Patent
Bergmann et al.

(10) Patent No.: US 8,328,138 B2
(45) Date of Patent: Dec. 11, 2012

(54) SUPPORTING STRUT FOR SUPPORTING AN INTERMEDIATE DECK THAT IS ARRANGED IN AN AIRCRAFT FUSELAGE

(75) Inventors: Anton Bergmann, Prien (DE); Marinus Sedlmeier, Hausham (DE)

(73) Assignee: Eurocopter Deutschland GmbH, Donawoerth (DE)

( * ) Notice: Subject to any disclaimer, the term of this patent is extended or adjusted under 35 U.S.C. 154(b) by 821 days.

(21) Appl. No.: 12/435,543

(22) Filed: May 5, 2009

(65) Prior Publication Data
US 2009/0277995 A1    Nov. 12, 2009

(30) Foreign Application Priority Data

May 6, 2008 (DE) .......... 10 2008 022 377

(51) Int. Cl.
*B64C 1/06* (2006.01)
*B27N 5/02* (2006.01)
*B32B 3/00* (2006.01)

(52) U.S. Cl. ........ 244/131; 264/239; 264/241; 428/110; 428/105; 428/107

(58) Field of Classification Search .......... 244/131; 264/239, 241, 257, 258; 428/105, 107, 109, 428/110, 111, 113
See application file for complete search history.

(56) References Cited

U.S. PATENT DOCUMENTS

| | | | |
|---|---|---|---|
| 4,413,822 A * | 11/1983 | Fernandez et al. ........... 473/536 |
| 5,188,872 A | 2/1993 | Quigley | |
| 5,221,391 A * | 6/1993 | Kittaka et al. ........... 156/171 |
| 5,720,246 A * | 2/1998 | Griffin et al. ........... 123/90.61 |
| 5,752,673 A * | 5/1998 | Schliwa et al. ........... 244/118.6 |
| 5,948,257 A * | 9/1999 | Custer et al. ........... 210/500.26 |
| 2002/0003004 A1 | 1/2002 | Guckert | |
| 2004/0012118 A1* | 1/2004 | Perez et al. ........... 264/257 |
| 2008/0173756 A1 | 7/2008 | Benthien | |
| 2010/0096506 A1 | 4/2010 | Benthien | |
| 2011/0108668 A1 | 5/2011 | Benthien | |

FOREIGN PATENT DOCUMENTS

| | | |
|---|---|---|
| DE | 10025628 A1 | 11/2001 |
| DE | 10060042 A1 | 6/2002 |
| DE | 102006058377 A1 | 6/2008 |
| DE | 102007011621 A1 | 7/2008 |

* cited by examiner

*Primary Examiner* — Rob Swiatek
*Assistant Examiner* — Marc Burgess
(74) *Attorney, Agent, or Firm* — Brooks Kushman P.C.

(57) ABSTRACT

A supporting strut for supporting an intermediate deck (2) that is arranged in an aircraft fuselage (1), includes a hollow cylindrical rod body (3) that includes a fiber reinforced material, with the two ends of the rod body (3) being designed as attachment sections for detachable attachment to the aircraft fuselage (1) or to the intermediate deck (2), wherein the rod body (3) includes at least one first reinforcement layer (10a) made from a carbon fiber fabric with an identical number of warp- and weft threads in 45° alignment or 90° alignment, as well as at least one second reinforcement layer (10b, 10c) made from a carbon fiber fabric including a higher number of warp threads than weft threads in 0° alignment, as well as a final layer including glass fiber, which together with artificial resin form a compact fiber reinforced material.

5 Claims, 2 Drawing Sheets

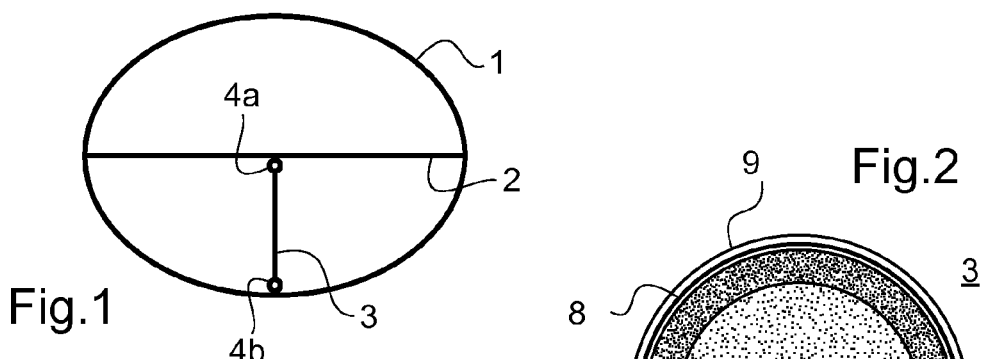
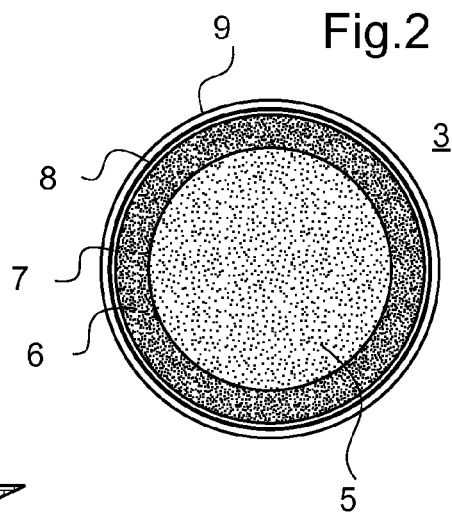
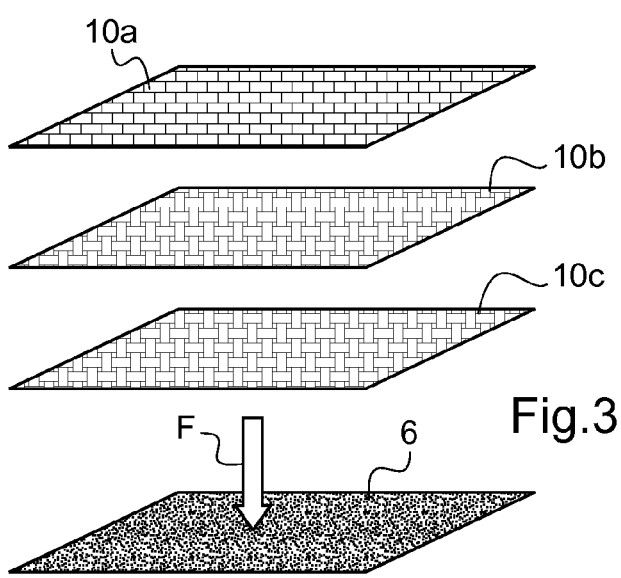
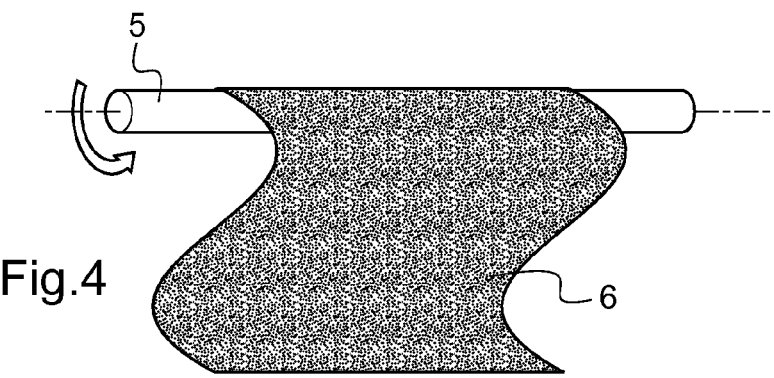

SUPPORTING STRUT FOR SUPPORTING AN INTERMEDIATE DECK THAT IS ARRANGED IN AN AIRCRAFT FUSELAGE

The present invention relates to a supporting strut for supporting an intermediate deck that is arranged in an aircraft fuselage, with said supporting strut comprising a hollow cylindrical rod body that comprises a fibre reinforced material, wherein the two ends of said rod body are designed as attachment sections for detachable attachment to the aircraft fuselage or to the intermediate deck. Apart from this, the invention also comprises a method for producing such a rod body. Furthermore, an aircraft comprising a fuselage in which such supporting struts are installed forms part of the invention.

BACKGROUND OF THE INVENTION

Aircraft of the type of interest in the present document comprise at least one intermediate deck that extends across an aircraft fuselage in order to create a multi-level design. In a commercial aircraft such an intermediate deck is, for example, provided in order to install passenger seats thereon, which passenger seats occupy the upper region of the aircraft fuselage. In contrast to this, the lower region of the aircraft fuselage, i.e. the region below the intermediate deck, is normally used as a cargo hold. In particular in case of large-volume aircraft fuselages, the corresponding large-area intermediate decks need to be additionally supported relative to the aircraft fuselage in order to provide adequate static stability. For this purpose the supporting struts of interest in this document, which are detachably attached between the at least one intermediate deck and the aircraft fuselage, are used.

From the general state of the art it is known to produce supporting struts by wrapping carbon fibre threads around a mandrel, which carbon fibre threads are then embedded in epoxy resin. Such winding usually takes place at an angle of approximately 45° relative to the longitudinal axis of the mandrel, and subsequently, in order to improve stability, at an angle of approximately 70° relative to the longitudinal axis of the mandrel. After the material has been wound onto the mandrel and after the epoxy resin has cured or hardened, the mandrel can be removed, and a hollow-cylindrical rod body results, which on both ends is fitted out with rod ends in order to make possible attachment to the intermediate deck and the aircraft fuselage respectively.

Such rod bodies are associated with a disadvantage as a result of the deviation of the fibre alignment from the optimal alignment, which deviation is due to the production process, thus resulting in thicker wall thicknesses in the dimensioning that is required to achieve adequate buckling resistance. Associated with this, the rod body has a comparatively heavier weight, which is basically undesirable in aircraft construction. Rod bodies produced in this way are associated with a further disadvantage in that shock loading can have a significant negative effect on the stability of the supporting strut. Known supporting struts are thus comparatively susceptible to damage. Furthermore, due to the material used, meeting the required fire-resistance characteristics is problematic or often achievable only with the use of additional measures, for example special coatings.

OBJECTS AND SUMMARY OF THE INVENTION

It is the object of the present invention to create a supporting strut whose rod body features a lightweight construction while at the same time providing good buckling resistance and resistance to damage, as well as providing improved fire-resistance characteristics.

This object is met, based on a supporting strut according to the precharacterising part of claim 1 in conjunction with its characteristic features. From the point of view of process technology, the object is met by claim 6. The respective related dependent claims disclose advantageous improvements of the invention.

The invention includes the technical teaching according to which the rod body comprises at least one first reinforcement layer made from a carbon fibre fabric with an identical number of warp- and weft threads in 45° alignment or 90° alignment as well as at least one second reinforcement layer made from a carbon fibre fabric comprising a higher number of warp threads than weft threads in 0° alignment, which together with artificial resin, preferably epoxy resin, form a compact fibre reinforced material.

The carbon fibre fabric that is used to form the reinforcement layers can either be made entirely from carbon fibre threads, or can at least predominantly comprise carbon fibre threads. The 45° alignment or 90° alignment stated refers to the direction of the warp threads relative to the longitudinal axis of the rod body. Analogously the same also applies in relation to the stated 0° alignment. In this case the warp threads extend parallel to the longitudinal axis of the rod body.

The prepreg interlaid scrim that arises by stack formation with the at least one first reinforcement layer together with the at least one second reinforcement layer can be designed such that a first reinforcement layer is arranged immediately adjacent to a second reinforcement layer, or such that several first reinforcement layers are combined with several second reinforcement layers and any others. The prepreg interlaid scrim used according to the invention features a fine count structure and in its final state is comparatively more resistant to impact loads. With the use of a special production method, which is explained below, good strength can be achieved with relatively thin walls. This method is based on repeated thermal compacting that reduces the settling distance of the material, reduces the risk of folds developing when the material is wound onto the mandrel, reduces the incidence of cavity formation and also stabilises the selected fibre orientation.

According to a measure that improves the invention, it is proposed that at least one outer reinforcement layer, instead of comprising a carbon fibre fabric, comprises a glass fibre fabric. When compared to carbon fibre fabric, glass fibre fabric has a special characteristic in that it renders impact damage cracks or delamination visually better detectable, which can be used to advantage as a visual damage indicator. Thus damage to the rod body can be detected in a simple manner without additional active sensors or expensive non-destructive testing (NDT) measures such as ultrasonic testing. Furthermore, the outer layer of the woven glass-fibre fabric provides protection from galvanic corrosion.

Preferably, each reinforcement layer should be made with at least two radial windings, so that adequate overall stability is provided. Two to three windings are particularly preferred. Winding can be facilitated by means of a rotary drive of the mandrel. Likewise it is imaginable to implement an axially spiraling layer structure of the various reinforcement layers so as to achieve improved stability. In this context it is important that the fibre orientation of 45°, 90° or 0° is largely maintained, and that the normal tolerance ranges of plus/minus 10% are adhered to. To this extent the information relating to the angular alignment according to the subject of the invention is to be interpreted as having to be within the tolerance range.

According to the invention, the rod body, which forms the subject of the invention, of the supporting strut is made by carrying out the following steps at least once:

a) first pre-compacting of a prepreg interlaid scrim, either at room temperature or at a higher temperature, comprising at least one first reinforcement layer made of a carbon fibre fabric with an identical number of warp- and weft threads in 45° alignment or 90° alignment, as well as at least one second reinforcement layer made of a carbon fibre fabric with a greater number of warp threads than weft threads in 0° alignment of the warp threads, which are connected with artificial resin under the force of pressure;

b) wrapping the prepreg interlaid scrim, which comprises the reinforcement layers, at least twice around a preferably preheated mandrel in order to produce a hollow cylinder;

c) wrapping a pre-tensioned thermoplastic woven textile tape for intermediate compacting around the mandrel onto which the prepreg interlaid scrim has been laid.

Preferably, in this way two to four prepreg interlaid scrims are formed by repeatedly carrying out the steps set out above so as to ensure adequate wall thickness while at the same time maintaining light weight. Each time, the woven textile tape that is used for second intermediate compacting is preferably removed, by unwinding, prior to the mandrel next being wrapped with a further prepreg interlaid scrim so that the thinnest-possible wall thicknesses can be achieved. The woven textile tape does not contribute to the stability of the rod body but instead is only used in a corset-like manner during production in order to generate an external counter-force when the material on the mandrel on the inside expands as a result of an increase in the temperature, thus causing the desired compacting effect. At the same time, as a result of this, air is evacuated from the fibre reinforced material, and excess artificial resin is removed. It is important to understand that compacting does not result in complete solidification of the artificial resin. Instead, complete curing of the artificial resin is achieved during a final processing step that will be described below. After all the reinforcement layers have been applied, and after intermediate compacting of them has been completed, a glass fibre prepreg is applied as a final single layer.

The temperature increase which causes a volume increase of the mandrel material, combined with a concurrent outer enclosing by means of the woven textile tape, in turn causes the fibre reinforced material to be de-aerated and compressed, with excess material being removed.

Final curing of the mandrel onto which the reinforcement layers have been placed in the manner described above preferably takes place according to the following steps:

g) a peel ply layer and/or a perforated release-film layer is wound onto the last, i.e. outermost, reinforcement layer for the purpose of removing excess artificial resin in order to improve the surface;

h) this is followed by a pre-tensioned thermoplastic woven textile tape as a last wrapping being wound on; after which i) curing of the artificial resin at an increase in the temperature, while at the same time final compacting is carried out.

This ensures that excess artificial resin is reliably removed to maximise stability, and that overall an outer surface of corresponding quality results. This is a prerequisite for any damage that the rod body may sustain becoming more easily visible.

In this arrangement final curing can be carried out in a computer-controlled curing oven with or without a rotary device.

Preferably, after the curing process, the woven textile tape as well as the peel ply layer and, if present, also the perforated release-film layer are removed by being unwound from the last or outermost reinforcement layer in order to obtain the rod body of the supporting strut so that it is ready for assembly.

After its removal from the mandrel, the rod body is cut to the desired dimension and the surfaces are activated for rod-end bonding.

Thereafter on each open end of the hollow-cylindrical rod body rod ends made from a light metal can be inserted, which rod ends in the installed state are preferably integrally fixed by means of a suitable adhesive material. Via the rod ends, detachable attachment to the aircraft fuselage and/or to the at least one intermediate deck of the aircraft fuselage takes place with the use of suitable screw-, pin- or bolt means.

BRIEF DESCRIPTION OF THE DRAWINGS

Further measures that improve the invention are shown below in more detail with reference to the figures together with the description of a preferred exemplary embodiment of the invention. The following are shown:

FIG. 1 a diagrammatic cross section of an aircraft fuselage with a supporting strut installed in an exemplary manner;

FIG. 2 a cross-sectional view of a rod body of the supporting strut during the manufacturing process;

FIG. 3 a perspective view to illustrate the intermediate production step of pre-compacting a prepreg interlaid scrim;

FIG. 4 a diagrammatic view to clarify the intermediate production step of winding the prepreg interlaid scrim according to FIG. 3 around a mandrel that is preheated if necessary;

MORE DETAILED DESCRIPTION

Figure 5:
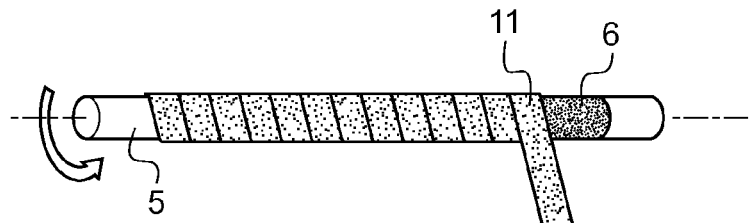
FIG. 5 a diagrammatic view to clarify the intermediate production step of intermediate compacting by means of a pre-tensioned woven textile tape.

According to FIG. 1, within an aircraft fuselage 1 there is an intermediate deck 2 that approximately in the centre is supported by a supporting strut that comprises a rod body 3, which supporting strut extends between the intermediate deck 2 and the aircraft fuselage 1 and on each of its ends comprises a rod end 4a, 4b for detachable attachment. The two rod ends 4a and 4b are made from light metal and are inserted in the hollow cylindrical rod body 3. Affixation in the installed position takes place by means of an adhesive.

According to FIG. 2 the rod body 3 of the supporting strut comprises a multilayer design; in the exemplary embodiment shown it comprises prepreg interlaid scrim 6, wrapped around an aluminium mandrel 5, the design of which prepreg interlaid scrim 6 will be explained in more detail below. In the illustration, for the purpose of clarifying final curing, a peel ply layer 7 is applied around the prepreg interlaid scrim 6 that comprises several reinforcement layers made of thermally compacted fibre reinforced material, and onto this a perforated release-film layer 8 is applied for removing excess artificial resin for the purpose of improving the surface. On the outside a pre-tensioned thermoplastic woven textile tape 9 is wrapped around this arrangement, wherein said textile tape 9 prevents expansion towards the outside during heating of the mandrel 5, thus ensuring compacting of the prepreg interlaid scrim 6.

Prior to the final hardening of the artificial resin, which hardening is illustrated in the diagram, as a result of an increase in the temperature to produce the rod body 3, the prepreg interlaid scrim 6 is generated according to the following layer design.

According to FIG. 3, a multilayer prepreg interlaid scrim 6 is generated in that a first reinforcement layer 10a comprising a carbon fibre fabric with an identical number of warp- and weft threads is layered in 45° alignment with two second reinforcement layers 10b and 10c which also comprise a carbon fibre fabric, which reinforcement layers 10b and 10c, however, comprise a greater number of warp threads than weft threads, wherein the warp threads are arranged in 0° alignment. These reinforcement layers 10a to 10c are connected together with artificial resin to form a compacted fibre reinforced material under the influence of a force of pressure F at room temperature, which fibre reinforced material forms the prepreg interlaid scrim 6.

According to FIG. 4, the pre-compacted prepreg interlaid scrim 6 is subsequently wound around the pre-heated mandrel 5, in the embodiment shown with three windings, in order to produce a hollow cylinder.

According to FIG. 5, a pre-tensioned thermoplastic woven textile tape 11 is wound around the mandrel 5 onto which the prepreg interlaid scrim has been laid. Pre-tension is generated by the tensile force $F_z$, with said pre-tension resulting in intermediate compacting of the prepreg interlaid scrim 6.

After intermediate compacting the woven textile tape 11 is removed in that it is unwound from the prepreg interlaid scrim 6.

The production sequence described above is subsequently repeated three more times.

Figure 6:
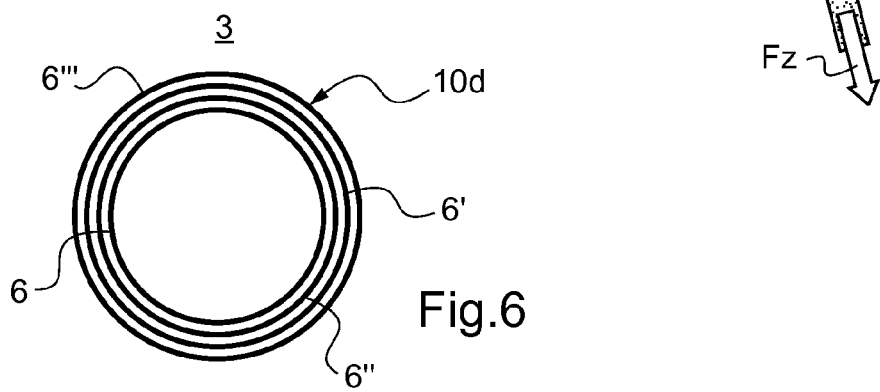
FIG. 6 a diagrammatic cross-sectional view of a rod body with a layer design of reinforcement layers.

According to FIG. 6, the rod body 3 produced in this way comprises a total of four pieces of prepreg interlaid scrim 6, 6', 6" and 6''' wound in a spiral shape. In this arrangement the last prepreg interlaid scrim 6''' comprises an exterior reinforcement layer 10d made of a glass fibre fabric instead of a carbon fibre fabric in order to form a visual damage indicator of the rod body 3.

Figure 7:
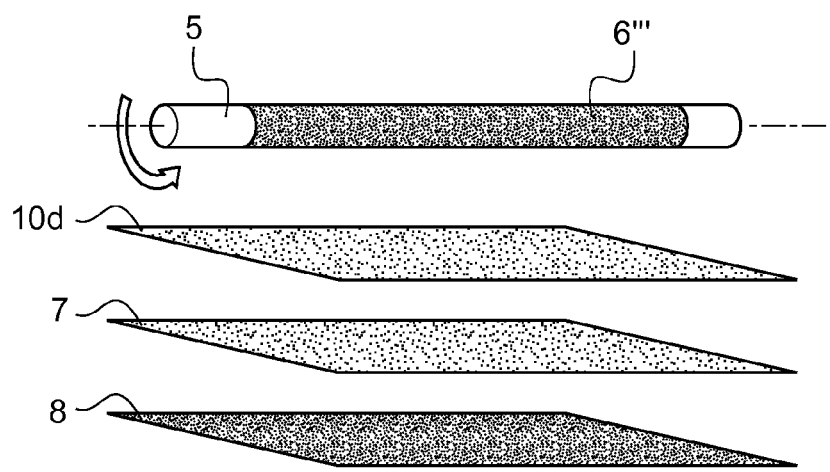
FIG. 7 a perspective view of the intermediate production step of wrapping the mandrel up in outer reinforcement layers.

According to FIG. 7, with the last prepreg interlaid scrim 6''' the outermost layer 10d made of glass fibre fabric is wound onto the mandrel 5. This is followed by the winding of a peel ply layer 7 onto this outermost reinforcement layer 10d, as well as subsequently by the winding of a perforated release-film layer 8 for removing excess artificial resin. In this state the artificial resin is not yet cured or hardened so that as a result of the winding of the peel ply layer 7 and of the perforated release-film layer 8 the surface of the rod body 3 is improved. Final curing of the artificial resin takes place at a further increase in the temperature with concurrent final compacting within a curing oven.

When the rod body 3 is cured, the woven textile tape 11 as well as the peel ply layer 7 and the perforated release-film layer 8 are removed by being unwound from the exterior reinforcement layer 10d so that the installation-ready rod body 3 of the supporting strut is formed. After its removal from the mandrel, the rod body is cut to the desired dimension and the surfaces are activated for rod-end bonding. Once the rod ends have been bonded into place the supporting strut is basically ready for use.

LIST OF REFERENCE CHARACTERS

1 Aircraft fuselage
2 Intermediate deck
3 Rod body
4 Rod end
5 Mandrel
6 Prepreg interlaid scrim
7 Peel ply layer
8 Release-film layer
9 Woven textile tape
10 Reinforcement layer
11 Woven textile tape

The invention claimed is:

1. A supporting strut for supporting an intermediate deck that is arranged in an aircraft fuselage, comprising a hollow cylindrical rod body that comprises a fibre reinforced material, wherein the two ends of said rod body are designed as attachment sections for detachable attachment to the aircraft fuselage or to the intermediate deck, characterised in that the rod body comprises at least one first reinforcement layer made from a carbon fibre fabric with an identical number of warp- and well threads in 45° alignment or 90° alignment as well as at least one second reinforcement layer made from a carbon fibre fabric comprising a higher number of warp threads than well threads in 0° alignment of the warp threads, which together with artificial resin form a compact fibre reinforced material, and an exterior reinforcement layer made of a glass fibre fabric provided as a visual damage indicator of the rod body.

2. The supporting strut according to claim 1, characterised in that each reinforcement layer is made with at least two windings.

3. The supporting strut according to claim 2, characterised in that the windings of the reinforcement layers are spiral shaped.

4. The supporting strut according to claim 1, characterised in that the end attachment sections of the hollow-cylindrical rod body are made from rod ends made from metal, which rod ends are inserted in said rod body and fixed by adhesive means.

5. An aircraft comprising an aircraft fuselage in which at least one intermediate deck is arranged that is stabilised with supporting struts according to claim 1, the supporting struts extending perpendicularly to said intermediate deck.

* * * * *